Patented Apr. 13, 1943

2,316,294

UNITED STATES PATENT OFFICE 2,316,294

PROCESS FOR OBTAINING INDIVIDUAL COLOR-COMPONENT RECORDS FROM MULTILAYER DIFFERENTIALLY COLOR-SENSITIZED FILM ELEMENTS

Virgil B. Sease, New Brunswick, and Deane R. White, South River, N. J., assignors, by mesne assignments, to E. I. du Pont de Nemours & Company, Wilmington, Del., a corporation of Delaware No Drawing. Application April 11, 1940, Serial No. 329,196

7 Claims. (Cl. 95—2)

This invention relates to color photography and more particularly to an improved method for providing photographic partial color records required for either additive or subtractive processes.

One object of this invention is to provide chemical means for obtaining individual color separation records from superposed color component records. A further object is to provide a method whereby multipack photographic records may be extended to form at least one more individual color record than the number of films in the multipack. Another object is to provide chemical means whereby individual color component records may be obtained from integrally superposer records formed in multilayered monopacks. Further objects will more plainly appear from the detailed description that is presented in exemplification and not in limitation herein.

In the art of subtractive color photography many forms and modifications of multipack films have been suggested. In the simpler arrangements, one of the films records one region of colors of the scene while the other film records another region. In the tripack arrangements each element records a given portion of the colors representing the original color scale.

Many disadvantages are present in these forms of multipack. In the bipack arrangement, the separation of the color range photographed by the two differently-sensitized films is not sharp nor complete, as usually some portion of the color scale is recorded on both films; in the final print this effect inevitably leads to color dilution and lack of purity of color rendition. In the ordinary tripack arrangement, the separation of the color scale into individual color component records is never satisfactory as the image of the rear film lacks detail and sharpness due to the fact that it is separated physically from the front image by at least the thickness of one emulsion and support. Furthermore, in printing, the image from the rear film is toned blue and represents the "drawing" of the scene, and this loss of sharpness here is particularly undesirable. In order to minimize this loss of image sharpness, the art has suggested certain camera arrangements wherein the middle and rear films of the ordinary tripack are exposed as a bipack arrangement at one aperture of the camera while the front film is exposed at a second aperture. These cameras are cumbersome and expensive, and require vigilant checking to ensure that the intricate optical system required is in alignment. Such cameras are rarely adaptable for black and white photography, and have failed to fill the urgent need in the industry for an inexpensive and simplified process that will produce faithful color.

The above and many other disadvantages of prior art methods for producing individual component color records are overcome by the invention hereinafter described.

The present invention in its broad aspects provides chemical means for obtaining individual color component records from the color component records formed in multilayer photographic elements such as films and plates, especially the color component records formed in such elements which are used in three color photography. It is well recognized that at least three fundamental colors are essential for the faithful reproduction of natural color. The elements which may be processed in accordance with this invention may be obtained in various ways, for example, by a simultaneous exposure of all layers in a camera or printing apparatus to light controlled by a colored object to be reproduced such as a color scene or a color transparency.

In its broad aspects the invention comprises processes for obtaining individual color-component records from exposed multilayer differentially color-sensitized film elements containing developed color component images by converting the superposed color component silver image records into silver salt image records by the use of a non-hardening bleach bath, redeveloping all but one inner image record without re-exposing the silver salt image records and removing an inner silver salt image record. An intermediate record of the superposed color component silver image records is printed before bleaching, and this is then printed in combination with the redeveloped silver images remaining after removal of the inner image record. This procedure reproduces the inner image record in the second printed record.

In the case of more than two original superposed color component silver image records, the above procedure may be repeated. Thus, with three superposed color component silver image records the printing of an intermediate record, removal of the innermost color component record and printing of a combination of the intermediate record and remaining superposed records is repeated twice.

In the processing of a bipack the element containing two superposed color component silver image records an intermediate record of the two superposed color component image records is first printed and the inner image record is removed and reproduced by printing a combination of the intermediate record and the remaining color component image record.

The invention is, of course, not limited to any specific arrangement of silver halide emulsion layers but on the contrary, may be used with various types. The preparation and initial exposure of the elements does not form a part of this invention but in order that it will be fully understood a description of some useful multilayer film elements shall be described. Such elements generally comprise a transparent base or bases and three or more differentially sensitized silver salt emulsion layers which are so arranged and sensitized that each will record approximately one-third of the visible spectrum. At least two of said layers are carried by a single base. Two or more of the layers may be on one side of a transparent base or two may be on one side and one on the other. In bipacks one transparent base member may carry two of such layers on the same side of the transparent bases.

The outer layer of the multilayer films, that is, which faces the object to be reproduced, is generally a blue sensitive silver halide layer and preferably contains admixed therewith or in a separate colloid medium a yellow filter dye such as tartrazine (C. I. 640); Luxol Fast Yellow or titanium ferrocyanide. A green-sensitized silver halide emulsion layer, containing erythrosine, for example, may form an intermediate layer and a blue sensitive silver halide emulsion layer imposed directly on the base. In an alternative construction utilizing a green-blind panchromatic emulsion layer a green sensitive silver halide emulsion layer is imposed directly on the base, next a green-blind red-sensitive silver halide emulsion containing a green-blind red sensitizing dye and finally a blue sensitized silver halide emulsion layer containing a yellow screening dye so that the green and red layers will not be exposed to the blue region of the spectrum, e. g. blue, violet and ultra violet. Suitable sensitizing dyes for the green-blind red-sensitive layer are described in Sease U. S. Patent 2,189,837. Such dyes have the general formulae:

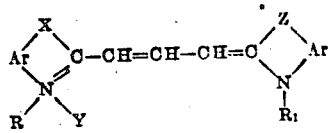

and

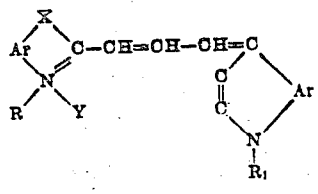

wherein X represents a radical taken from the group consisting of —O—, —S—, and dialkylmethylene, Z represents a bivalent radical different from X taken from the class consisting of —O—, —S—, dialkylmethylene and vinylene, R and R' represent alkyl radicals, Y represents the negative radical of an acid and Ar represents an arylene radical of the benzene series.

Other arrangements are known and can be effectively and economically processed in accordance with the teachings hereof.

Treatment of a bipack

In a preferred embodiment of the invention a bipack is used. Thus, the bipack may consist of a transparent support carrying a blue-sensitive photographic layer in which is incorporated a removable yellow dye such as Luxol Yellow. Facing this front film, and in contact with it, is a second support coated with green-and-red-sensitive layers. In the preferred form a red sensitive photographic layer is coated on the support, over this is coated a water-permeable layer, such as gelatine, casein and the like, stained red with a removable dye such as Congo Red or Carmosin M and on this is coated a green sensitive photographic layer. The latter emulsion is in contact with the emulsion surface of the front film and all sensitive layers are of the well-known silver halide gelatine emulsion type. Upon exposure to a natural or colored scene all color records are formed simultaneously; the blue record is formed in the emulsion layer of the front film, the green record is formed in the top layer of the rear film and the red record is formed in the lower layer.

After exposure the two films are developed in an ordinary developer, fixed and washed. The rear film now carries a series of two, superposed, color-component records in terms of metallic silver. A print or intermediate record is made of the superposed images onto a printing stock such as the well-known "positive" type of printing stock, however, the type of printing medium may be carried to suit the individual case. After printing the superposed images, the print is developed, fixing washed and dried. The baths used for the processing of this print are of the well-known type. The two layer element containing developed color silver image records is then treated with a silver bleaching bath to convert the silver images into a re-developable form, that is, into the form of a silver salt, and the outer layer only is redeveloped.

The record on the front film is an individual record and subsequently may be printed onto a suitable printing medium, such as a positive stock or duplicating stock film.

The characteristics of speed and contrast of the printing medium, the printing exposure and the development given the print may all be varied to obtain a satisfactory print. Such a print is one which, when placed in registered superimposition with the original negative, the details of the images of the individual films are cancelled out and the combined films present the appearance of a neutral deposit of even transparency. The desired quality of the positive print may also be described as that condition wherein the "gamma" of the print is approximately unity and all the silver densities of the image lie on the portion of the curve commonly known as the straight line portion of the characteristic curve of the printing medium. The former of these two methods of determining the satisfactory quality of the print is particularly convenient to the still photographer who is usually not equipped with sensitometric apparatus. The second method is particularly adaptable to the motion picture processing laboratory wherein the determination of the "gamma" of printing stock is a routine operation.

In the conversion into redevelopable form, the film is treated so as to convert the silver images into a from wherein they can be removed by solution in a silver salt solvent. The treating baths which are non-hardening bleach baths may vary widely in their constitution. The following are examples of suitable baths:

A

| | | |
|---|---|---|
| Potassium ferricyanide | grams | 35 |
| Ammonium hydroxide, concentrated | mls | 5 |
| Water | liter | 1 |

B

| | | |
|---|---|---|
| Potassium ferricyanide | grams | 20 |
| Potassium bromide | do | 20 |
| Water to | liter | 1 |

C

| | | |
|---|---|---|
| Cupric bromide | grams | 30 |
| Water to | liter | 1 |

The time of bleaching varies somewhat, but in general the time will be in the order of about 2 to 4 minutes for complete bleaching. Ferrocyanide bleach baths and halogenizing bleaches are advantageous for the reason that re-exposure is generally not necessary. After bleaching, the film is washed, and preferably dried, and then only the outer layer is redeveloped. For heavy image density, the bleached image can be slightly re-exposed if necessary. Outer-image development may be accomplished in a number of ways such as (a) using concentrated developers which will fully re-develop the outer image before the developer has had time to penetrate into the lower layers, or (b) the developer may be timed by trial tests to determine the time required to penetrate only the outer layer and development then carried out for this length of time or (c) retardants which do not adversely affect the film and are neutral in their reaction may be used. Suitable substances include mono- and polyhydric alcohols, e. g. methyl, ethyl, n-propyl, isopropyl, butyl, amyl; glycerol, ethylene and propylene glycol, etc.; gelatine, gum arabic, etc. in water, various solids such as sugar, sodium cellulose glycollate, methyl cellulose and sodium sulfate. The amounts of these inert retardants may vary widely from 10 to 500 parts, for instance, of the aqueous solution representing a practical range. In general 20 to 40% is sufficient. A very effective composition of this type is as follows:

| | | |
|---|---|---|
| Sodium sulfite, anhy | grams | 60.0 |
| Hydrochinon | do | 4.9 |
| Sodium carbonate, anhy | do | 48.0 |
| Metol | do | 1.4 |
| Sugar | do | 350.0 |
| Potassium bromide | do | 1.6 |
| Water to | liter | 1 |

The time of development required to redevelop only the outer image varies considerably depending on the characteristics of the gelatine used in making the emulsion and the treatment given the film during processing it to the original silver-image stage, but generally, 1½ minutes at 68° F. has been found to produce satisfactory development. After re-developing an outer of several component images on a multilayered film, the lower or inner images are removed by a silver salt solvent, for example, a 25% solution of sodium thiosulfate and the film is then washed and dried.

The following summarizes the steps required for the preparation of individual color component records from integrally superposed component records:

1. Original exposure on multilayered film carrying differently color-sensitized layers.
2. Development, fixing, washing and drying.
3. Making a print of the multilayered original.
4. Bleaching multilayered original.
5. Re-developing outer layer of original.
6. Removing lower layer of original.
7. Making a print through print of original in combination with original film with all but the inner layer redeveloped.

It is thus evident that the above-described modification of the novel process previously set forth makes possible the removal of layers of images positioned beneath an outer image layer. This allows the outer image to be printed in optical contact, which effectively serves to minimize scatter and loss of image detail due to the separation caused by any intervening transparent layer.

In the present invention, the intermediate printing medium may be of the well-known unsensitized, "positive" emulsion or it may be sensitized to extend its sensitivity to those regions of the radiation spectrum lying beyond the visible range. Thus, if the printing emulsion is sensitized to the ultra-violet region, a source of ultra-violet radiation may be employed to expose through the combination intermediate record and multilayered film herein described. In like manner, the printing medium may be sensitized to long-red or infra-red radiation and infra-red rays may be used to print the combined records.

The herein described three color-component records can thus be used for the various color-photography processes which require three color-separation negatives. It is also contemplated that the original exposure on the modified bipack need not be confined to an original scene but may also represent the printing exposure through a colored transparency as in the case of making separation negatives from additive color transparencies.

It is further contemplated that while the example set forth above in exemplification of the invention has been confined to bipack arrangements wherein one of the films carries at least two sensitive layers or coatings, it is also possible to apply to multilayered monopacks the process of preparing individual color component records by making a single-layered intermediate record of the superposed images, removing one of the superposed images, and re-forming the image removed by passing a printing exposure through the intermediate record in registered combination with the multilayered film minus one of the originally-formed images. In the case of a film comprising a support and at least three differently color-sensitive emulsion layers the above process is repeated twice to reform the images removed. The third image record being that one remaining on the multilayered film.

It is also contemplated that the various emulsion layers of a multilayered film may be separated by water-permeable layers of gelatine, or other water-dispersible proteins which may or may not be colored with removable filter dyes to aid in the spectral separation of the sensitive layers.

In addition to employing developers containing thickening or viscosity-increasing agents, the developer for reducing the outer bleached image may be of the surface-setting type as described in British specification 489,299 for color-former developers. Thus, to a metal-hydroquinone positive developer, may be added an equal volume of warm, 8% boiled starch solution. The thickened developer is allowed to cool somewhat and applied. When development is completed, the set developer is removed with slightly warm water.

This application is a continuation-in-part of copending application, Serial No. 132,144, filed March 20, 1937.

The herein described preferred embodiments are given in illustration and not in limitation of the invention which is intended to include all variations and modifications within the spirit and scope of the appended claims.

We claim:

1. In a process for obtaining individual color-component records from a multilayer differentially color-sensitized film element containing developed color component images, which are disposed in respective, non-dyed, water-permeable colloid layers, the steps which comprise converting the superposed silver images into silver salt images by using a non-hardening bleach bath, redeveloping all but the inner image without re-exposing the element and directly removing said inner silver salt image.

2. In a process for obtaining individual color-component records from a multilayer differentially color-sensitized film element containing developed color component images which are disposed in respective, non-dyed gelatin layers, the steps which comprise converting the superposed silver images into silver salt images by using a non-hardening bleach bath, redeveloping all but the inner image without re-exposing the element and directly removing said inner silver salt image in a fixing bath.

3. A process for obtaining individual color-component records from a multilayer differentially color-sensitized film element containing developed component images which comprises printing an intermediate record of said superposed records, converting the silver images to silver salt images by using a non-hardening bleach bath, redeveloping an outer layer of said element without re-exposing the element, directly removing an inner silver salt image and printing a combination of said intermediate record with the remaining images in said film.

4. A process for obtaining individual color-component records from a bipack wherein one element thereof carries two different color silver image records which comprises printing an intermediate record of said superposed records, converting the silver images to silver salt images by using a non-hardening bleach bath, redeveloping an outer layer of said element, directly removing the inner image record and printing a combination of said intermediate record with the remaining images in said film.

5. A process for obtaining individual color-component records from a bipack wherein one element thereof carries two different color silver image records which comprises printing an intermediate record of said superposed records, converting the silver images to silver salt images by using a non-hardening bleach bath, redeveloping an outer layer of said element without re-exposing the same, directly removing the inner silver salt image record, and printing a combination of said intermediate record with the remaining images in said film.

6. In a process for producing individual color-component records from an exposed and developed blue-green, red silver image record bipack film wherein green and red silver image record layers form one element of the bipack, the green layer being outermost, the steps which comprise printing an intermediate record of the superposed green and red silver image record layers and then converting the green and red silver image records to silver salt image records by using a non-hardening bleach bath, redeveloping the green silver salt image layer of said element without re-exposing the same, directly removing the red silver salt image record and printing a combination of said intermediate record with the remaining green silver image record.

7. In a process for producing individual color-component records from an exposed and developed blue-green red silver image record bipack film wherein green and red silver image record layers form one element of the bipack, the green layer being outermost; the steps which comprise printing an intermediate record of the superposed green and red silver image record layers and then converting the green and red silver image records to silver salt image records by using a ferricyanide bleach bath, redeveloping the green silver salt image layer of said element without re-exposing the same, directly removing the red silver salt image record and printing a combination of said intermediate record with the remaining green silver image record.

VIRGIL B. SEASE.
DEANE R. WHITE.